United States Patent
Tschernko et al.

(10) Patent No.: US 10,233,118 B2
(45) Date of Patent: Mar. 19, 2019

(54) DEVICE FOR EXPANSION OF SAND GRAIN-SHAPED RAW MATERIAL

(71) Applicant: Binder + Co AG, Gleisdorf (AT)

(72) Inventors: Harald Tschernko, Gleisdorf (AT); Marcus Alfred Pusch, Graz (AT); Bernhard Neukam, Stattegg (AT); Ernst Erwin Brunnmair, Graz (AT)

(73) Assignee: Binder + Co AG, Gleisdorf (AT)

( * ) Notice: Subject to any disclaimer, the term of this patent is extended or adjusted under 35 U.S.C. 154(b) by 0 days.

(21) Appl. No.: 15/315,378

(22) PCT Filed: Jun. 5, 2015

(86) PCT No.: PCT/AT2015/050142
§ 371 (c)(1),
(2) Date: Nov. 30, 2016

(87) PCT Pub. No.: WO2015/184481
PCT Pub. Date: Dec. 10, 2015

(65) Prior Publication Data
US 2017/0107147 A1    Apr. 20, 2017

(30) Foreign Application Priority Data
Jun. 5, 2014 (AT) .................. GM50088/2014 U

(51) Int. Cl.
*C04B 20/06* (2006.01)
(52) U.S. Cl.
CPC .................. *C04B 20/068* (2013.01)
(58) Field of Classification Search
CPC ........................ C04B 20/06; C04B 20/068
USPC ...................................... 23/313 AS
See application file for complete search history.

(56) References Cited

U.S. PATENT DOCUMENTS

| 2,625,512 A | 1/1953 | Powell |
| 4,180,185 A | 12/1979 | Fujiki et al. |
| 2017/0107146 A1 | 4/2017 | Tschernko |

FOREIGN PATENT DOCUMENTS

| DE | 197 22 906 A1 | 12/1998 |
| WO | WO 2009/009817 A1 | 1/2009 |
| WO | WO 2013/053635 A1 | 4/2013 |
| WO | WO 2015/184481 | 12/2015 |
| WO | WO 2015/184482 | 12/2015 |

OTHER PUBLICATIONS

Notice of Allowance and Fees(s) Due in U.S. Appl. No. 15/315,253, dated Oct. 5, 2017.
International Search Report issued in PCT/AT2015/050142, dated Sep. 11, 2015.
International Search Report issued in PCT/AT2015/050143, dated Sep. 24, 2015.

*Primary Examiner* — Edward M Johnson
(74) *Attorney, Agent, or Firm* — Morse, Barnes-Brown & Pendleton, P.C.; Sean D. Detweiler, Esq.

(57) ABSTRACT

A method and system for expanding sand grain-shaped raw material drops raw material downwards through a substantially vertical heated shaft equipped for forming a temperature profile, in which a shaft flow prevails wherein raw material expands as a result of heat transfer in the shaft to form expanded granulate, and the granulate formed is passed into a pneumatic conveying line with a conveying flow for further transport. The method and system continuously measure the bulk density of the expanded granulate to continuously check the quality of the expansion process, automatically or manually adapting the temperature profile in the shaft and/or automatically or manually reducing the feeding of raw material into the shaft upon detecting a deviation from at least one defined bulk density.

8 Claims, 2 Drawing Sheets

DEVICE FOR EXPANSION OF SAND GRAIN-SHAPED RAW MATERIAL

CROSS-REFERENCE TO RELATED APPLICATIONS

This application is a national stage filing under 35 U.S.C. 371 of International Application No. PCT/AT2015/050142, filed Jun. 5, 2015, which claims priority to Austrian Application No. GM 50088/2014, filed Jun. 5, 2014. The entire teachings of the above PCT Application No. PCT/AT2015/050142 are incorporated herein by reference.

FIELD OF THE INVENTION

The invention relates to a method for the expansion of sand grain-shaped raw material in which the raw material drops downwards through a substantially vertical heated shaft provided with means for forming a temperature profile, in which a shaft flow prevails wherein as a result of heat transfer in the shaft, the raw material expands to form expanded granulate and the granulate formed is passed into a pneumatic conveying line with a conveying flow for further transport, as well as to an apparatus which comprises a separating device, preferably a gas cyclone which can be connected to a pneumatic conveying line.

PRIOR ART

A method for producing an expanded granulate from sand grain-shaped raw material is disclosed in WO 2013/053635 A1, where the object consists in adjusting a closed surface of the expanded granulate in a controllable manner so that the expanded granulate exhibits no hygroscopicity or hardly any hygroscopicity. In addition, the possibility of specifically influencing the surface structure of the expanded granulate and therefore the roughness is to be provided. To this end, this document proposes providing a plurality of independently controllable heating elements arranged along the drop section of the sand grain-shaped raw material and performing a temperature detection along the drop section, wherein the heating elements are controlled depending on the detected temperature below the region in which the expansion process takes place. Removal of the expanded granulate from the lower end of the drop section is ensured by means of a pneumatic conveying line into which the drop section opens.

As a result of the vertical alignment of the shaft and as a result of the additional introduction or extraction of process gases accompanying the expansion process, flows occur inside the shaft which act on the sand grain-shaped raw material. In particular, the formation of a near-wall upwardly directed boundary layer flow has a positive effect on the quality of the expansion process since this boundary layer flow prevents any baking of the sand grain-shaped raw material on the wall of the shaft. If the expansion shaft is closed towards the top, in addition to the upwardly directed boundary layer flow, a central downwardly directed core flow is established. This core flow prevents some of the above-described boundary layer flow and therefore results in baked-on deposits. The influence of the core flow can be reduced by the hitherto-known extraction/in-blowing of process gas from/into the head region of the shaft.

Such above-described baked-on deposits on the shaft walls has the result that the heat transfer from the shaft walls to the raw material deteriorates. In addition, this results is a detachment of the boundary layer flow which leads to additional baked-on deposits in other regions of the shaft. As a result, the quality of the expansion process deteriorates appreciably and the fraction of undesired, unexpanded granulate leaving the shaft is increased.

Since the sand grain-shaped raw material is a naturally occurring raw material, this has fluctuations in its composition, for example, in the fraction of propellants. This has the result that at constant process parameters, possibly during the formation of a specific temperature profile in the shaft by the variously controllable heating elements, the quality of the expansion process depending on the condition of the raw material is not constant.

In known processes the quality of the expansion process is only measured on a random sample basis and the process is then re-adjusted or stopped.

It can thus be seen to be a disadvantage of the prior art that neither the fluctuating composition of the sand grain-shaped raw material nor the formation of baked-on deposits can be detected promptly, which in each case results in a deterioration of the quality of the end product since the fraction of the unexpanded granulate increases or the desired properties of the expanded granulate are not achieved.

DE 6608156 U relates to a device for determining the liter weight of combustion material, wherein a container connected to a weighing device is filled continuously via a double vibrating sieve and combustion material can be discharged continuously from the container by means of a discharge device.

DESCRIPTION OF THE INVENTION

The formulation of the object forming the basis of the present invention is to provide a method for producing an expanded granulate from sand grain-shaped raw material and a device for measuring the bulk density, which does not have the described disadvantages and ensures that the quality of the expansion process is continuously monitored. The method should ensure trouble-free and low-maintenance operation. The device should be characterized by a simple and reliable design. Furthermore, it should be possible to retrofit the invention to existing systems without major expenditure.

This object is achieved by the method mentioned initially whereby the bulk density of the expanded granulate is measured continuously, wherein upon detection of a deviation from at least one defined bulk density, the temperature profile in the shaft is automatically or manually adjusted and/or the feeding of raw material into the shaft is reduced automatically or manually.

The invention is based on the fact that as a result of a continuous measurement of the bulk density, the quality of the expansion process is continuously monitored. If the bulk density changes, the expansion process can be adapted accordingly. This can be accomplished on the one hand, whereby a signal, for example, a warning tone, notifies the user that an adjustment of the process is required or on the other hand, by an automated processes wherein the system automatically adapts the process according to predefined parameters.

If a fluctuation condition of the raw material is determined on the basis of the variation of the bulk density, this can be compensated by adapting the temperature profile in the shaft. If however baked-on deposits in the shaft are determined as a result of the measurement, the feeding of raw material can be reduced, preferably stopped in order to prevent further baked-on deposits in the shaft and thus minimize the repair expenditure.

With regard to the sand grain-shaped raw material, not only mineral sands can be used in which water is bound as propellant such as, for example, pearlite or obsidian sand. This can also comprise mineral dust which is mixed with water-containing mineral binder where in this case the water-containing mineral binder acts as propellant. The expansion process can in this case proceed as follows: the mineral dust which consists of relatively small sand grains having a diameter of, for example, 20 pm, forms larger grains of, for example, 500 pm with the binder. At a critical temperature the surfaces of the sand grains of the mineral dust become plastic and form closed surfaces of the larger grains or melt to form such. Since the closed surface of an individual larger grain is usually overall smaller than the sum of all the surfaces of the individual sand grains of the mineral dust which are involved in the formation of this larger grain, in this way surface energy is gained or the ratio of surface to volume decreases. At this moment, larger grains each having a closed surface are present where the grains comprise a matrix of mineral sand dust as well as water-containing mineral binder. Since the surface of these mineral grains as previously are plastic, the forming water vapour can subsequently expand the larger grains. That is, the water-containing mineral binder is used as propellant. Alternatively mineral dust can also be mixed with a propellant, where the propellant is blended with mineral binder which preferably contains water. $CaCO_3$ for example can be used as propellant. In this case, the expansion process can take place similarly to that described above: the mineral dust which has a relatively small sand grain size (for example, 20 pm diameter) forms larger grains (for example, 500 pm diameter) with the propellant and the mineral binder. Upon reaching a critical temperature, the surfaces of the sand grains of the mineral dust become plastic and form a closed surface of the larger grains or fuse to form such. The closed surfaces of the larger grains are plastic as previously and can now be expanded by the propellant. If the mineral binder is water-containing, this can function as additional propellant. Thus, in a preferred embodiment of the method according to the invention it is provided that the mineral material with propellant comprises a mineral material in which water is bound and acts as propellant or mineral dust mixed with water-containing mineral binder which acts as propellant or mineral dust mixed with a propellant which is blended with mineral binder, wherein the mineral binder preferably contains water and acts as additional propellant. In order to be able to carry out the method presented as efficiently as possible, in addition to a shaft furnace it is preferable to provide a plurality of heating zones with (independently of one another) controllable heating elements as well as an intelligent regulating and control unit. This controls the heating elements preferably as a function of measured temperatures along the furnace shaft.

The method according to the invention can for example be configured as in WO 2013/053635 A1. Its disclosure is therefore incorporated fully in this description.

According to a preferred embodiment, the conveying flow is produced by an extraction device. If the extraction device is attached at the end of the conveying line facing away from the shaft, a conveying flow is obtained over the entire length of the conveying line, where other elements such as, for example, filter systems can be attached in the conveying line.

In another embodiment, it is provided that the expanded granulate is separated from the conveying flow in the conveying line by a separating device, preferably a gas cyclone. By attaching a separating device in the conveying line, it is possible to separate the expanded granulate. Since the expanded granulate comprises the end product of the method, the concentrated removal from the conveying flow, in particular by a gas cyclone, is advantageous since this can be connected to a container such as, for example, a silo.

In a further preferred embodiment, the bulk density of the granulate separated by the separating device, in particular the gas cyclone is measured. A measurement at this point of the process is particularly advantageous since no additional complex units are required in the conveying line such as possibly optical media or a separate measuring line.

According to a particularly preferred embodiment the separated expanded granulate is concentrated to form a granulate flow and this is guided into a measuring container, wherein the measuring container is connected to a measuring device to determine the bulk density. In this way, a measurement of the bulk density is achieved over a defined volume of the measuring container and the mass weighed by means of the measuring device is achieved. In this case, the geometry of the measuring container should preferably be configured very simply, possibly as a cylinder or rectangular prism. As a result of the concentrating of the granulate flow, a uniform filling of the measuring container is ensured so that this is sufficiently filled even with low utilization of the process or a change in the quality of the expansion process is detected sufficiently rapidly.

A further preferred embodiment provides that a dosing element is provided between shaft and conveying line, in which the quantity of granulate which is transferred from the shaft into the conveying line is regulated by means of means for regulation so that a defined material accumulation of the granulate is formed in the dosing element as buffer, which decouples the shaft flow from the conveying flow. This arrangement in particular has positive effects on the shaft flow if the shaft flow is thereby decoupled from the conveying flow since pressure fluctuations from the conveying line, possibly due to the cleaning cycle of a filter, no longer affect the shaft flow and the frequency of baked-on deposits in the shaft can also be reduced as a result.

Further particularly preferred embodiments provide that process air is extracted from the head region of the shaft or that process air is blown into the head region of the shaft in order to stabilize the part of the shaft flow directed to the head region. This variant achieves a particularly high quality of the expansion process since as a result of the extraction or blowing-in of process air, the flow conditions are stabilized in that no secondary flows promoting harmful baked-on deposits are promoted.

A device according to the invention for measurement of the bulk density of the expanded granulate comprises a separating device configured as a gas cyclone which can be connected to a pneumatic conveying line, wherein at least one measuring container which has a base surface for receiving at least a part of the granulate flow from the separating device configured as a gas cyclone is arranged underneath the gas cyclone in the operating state, wherein the measuring container is connecting to a measuring device for determining the bulk density. It has proved to be very advantageous if the separating device is configured as a gas cyclone although other separating devices are also feasible.

This device is based on the fact that the granulate separated by the separating device (by the gas cyclone) is transferred into a measuring container in order to fill this and keep it filled, wherein the entire granulate flow need not enter into the measuring container, a part thereof is sufficient. Since the measuring container is located underneath the gas cyclone in the operating state, no further conveying device is required, gravity is sufficient. The bulk density can now be measured in a simple manner by means of a suitable measuring device using the defined volume of the measuring container.

In a further preferred embodiment of a device according to the invention for measuring a bulk density of the expanded granulate, a means for concentrating the granulate flow, preferably a funnel, is disposed between the separating device configured as a gas cyclone and the measuring container, whereby a particularly simple concentrating is achieved. As a result of the formation of the concentrated granulate flow, filling of the measuring container is ensured even when little granulate is located in the conveying flow.

A further particularly preferred embodiment of a device according to the invention for measuring the bulk density of the expanded granulate provides that the measuring container is connected to the measuring device via a side arm, whereby a particularly simple positioning of the measuring container in the granulate flow is achieved which can also be retrofitted to already existing systems.

In a further preferred embodiment of a device according to the invention for measuring a bulk density of the expanded granulate, the measuring device is configured as a weighing device, preferably as scales. This simple form of weight determination allows a technically non-complex and cost-effective measurement of the bulk density and can be installed without major additional expenditure.

According to a further particularly preferred embodiment of a device according to the invention for measuring the bulk density of the expanded granulate, an overflow for at least a part of the granulate flow is provided on the measuring container. This variant makes it possible to prevent an accumulation of the granulate flow when the measuring container is completely full whereby the excess part of the flow can escape from the measuring container, preferably over the edge of the measuring container.

In a further particularly preferred embodiment of a device according to the invention for measuring the bulk density of the expanded granulate, the measuring container has openings in the base surface to allow at least a part of the granulate flow to drain continuously. This arrangement ensures that a certain part, preferably 60% of the entire production quantity of the expanded granulate, can flow continuously through the measuring container in order to enable a prompt measurement of the bulk density and thus the determination of the expansion quality.

According to an alternative particularly preferred embodiment of a device according to the invention for measuring the bulk density of the expanded granulate, the base surface of the measuring container has no openings although a device for cyclic emptying of the measuring container, preferably by pivoting, is provided. Such a design of the measuring container is not sensitive to blockages where the exchange of granulate is achieved by the emptying processes provided so that a prompt measurement is possible. Emptying by pivoting is particularly to be preferred since it can be carried out very simply.

The initially formulated object is solved by a system according to the invention for carrying out a method according to the invention using a device according to the invention for measuring the bulk density, where the substantially vertical heated shaft is connected via the pneumatic conveying line to the separating device configured as a gas cyclone.

BRIEF DESCRIPTION OF THE FIGURES

A detailed description of a method according to the invention and a device according to the invention now follows. In the figures.

WAYS FOR IMPLEMENTING THE INVENTION

Figure 1:
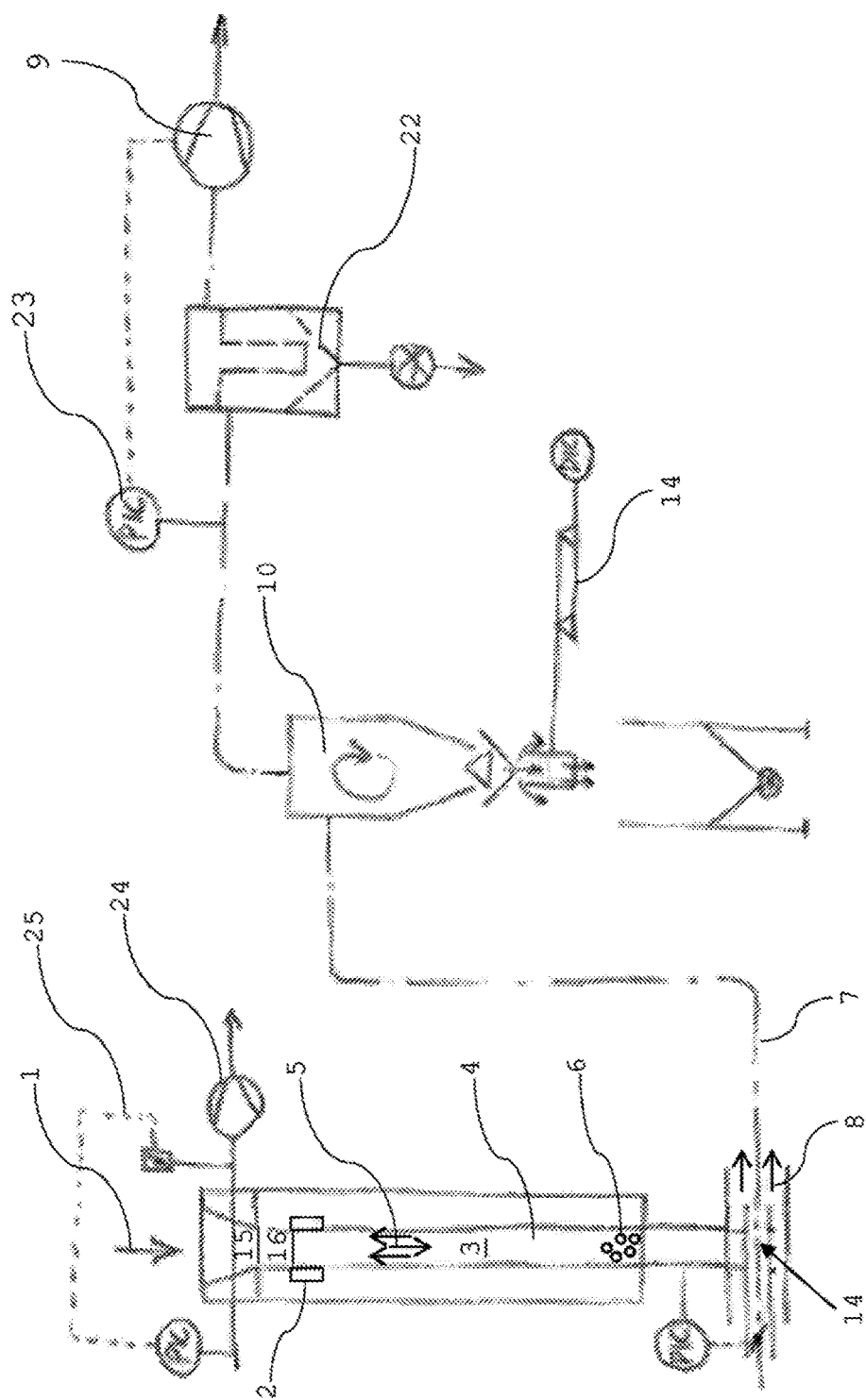
FIG. 1 shows a schematic image of a system according to the invention.

FIG. 1 shows a system for expansion of sand grain-shaped raw material 1. In this case, the raw material 1 falls through a vertical shaft 4 which can be heated by means 2 for forming a temperature profile 3, in the present embodiment a plurality of electrical resistance heaters 2 are used. The raw material is fed in the head region 15 of the shaft 4. Since the resistance heaters 2 can be controlled individually, a specific temperature profile 3 can be established along the shaft 4. As a result of the thermal radiation which acts on the raw material 1 from the shaft 4, the raw material 1 expands to form expanded granulate 6. Due to the heated walls of the shaft 4 and the ensuing process air 16, a shaft flow 5 is established in the shaft 4.

An additional extraction device 24 is provided in the head region 15 of the shaft 4, which extracts process air 16 from the head region 15 and thus stabilizes the shaft flow 5. In addition, a control loop 25 is coupled to the additional extraction device 24 which regulates the fraction of extracted process air 16 and sucked-in ambient air. Likewise, process air 16 can be blown into the head region 15 to stabilize the shaft flow 5 either by this additional extraction device 24 or by another device not shown here.

Located at the lower end of the shaft 4 is a dosing element which regulates the quantity of granulate 6 conveyed from the shaft 4 into the pneumatic conveying line 7. In alternative embodiments, this dosing element 14 is not provided, with the result that the shaft 4 opens directly into the conveying line 7.

An extraction device 9, which is preferably designed as a fan, is mounted at one end of the pneumatic conveying line which sucks ambient air from the other end of the conveying line 7, which is designed to be open to the atmosphere and thus conveys expanded granulate 6. A gas cyclone 10 is located inside this conveying line 7 via which granulate 6 is separated from the conveying line. Located in the conveying line 7 is a filter system 22 which is preferably disposed between gas cyclone 10 and extraction device 9 which separates small particles from the conveying line 7. By measuring the differential pressure by means of an additional measuring device 23, the conveyed quantity of the extraction device 9 is controlled so that the flow velocity in the conveying line 7 remains constant even when the filter system 22 is contaminated.

Figure 2:
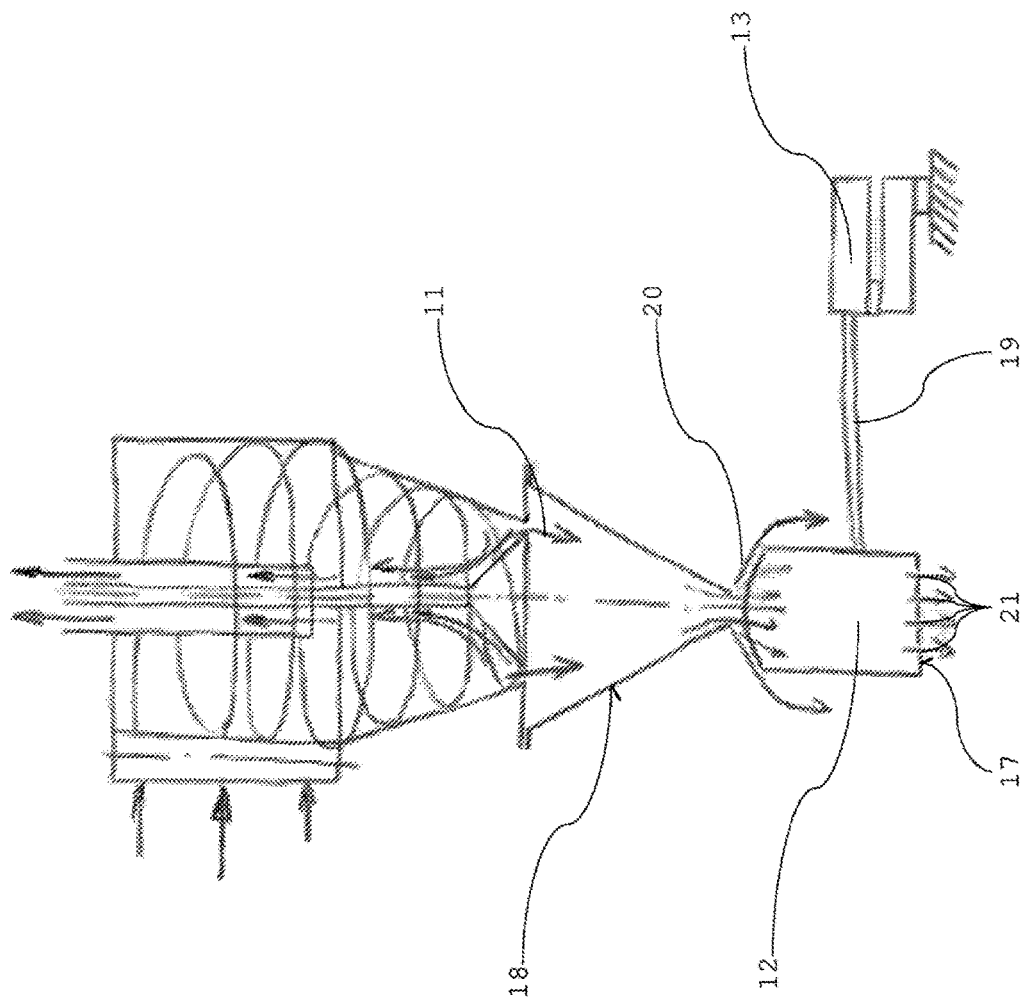
FIG. 2 shows a detailed view with respect to FIG. 1 with a device according to the invention.

FIG. 2 shows a detailed view of a device for measuring the bulk density of the expanded granulate 6 which is separated from the conveying line 7 as a granulate flow 11 by means of a separating device, here designed as a gas cyclone 10, which is connected to the pneumatic conveying line 7. In this embodiment a measuring container 12 is mounted underneath the gas cyclone 10 in the operating state, which receives at least a part of the granulate flow 11 which is separated from the conveying line 7 in the gas cyclone 10. In order to concentrate this granulate flow 11, a funnel 18 is located between the gas cyclone 10 and the measuring container 12. Preferably the longitudinal axes of the gas cyclone 10, the funnel 18 and the measuring container 12 coincide to form one axis. The part of the granulate flow 11 which cannot be received by the measuring container 12 can escape from this by means of an overflow over the edge of the measuring container 12. The measuring container 12 is connected via a side arm 19 to the measuring device 13 which is designed as a weighing device. By determining the weight in the weighing device and the known volume of the measuring container 12, the bulk density of the expanded granulate 6 can thus be measured continuously. If deviations from the desired bulk density are determined, the temperature profile 3 of the shaft 4 is modified by reference to empirical values or the quantity of raw material fed to the shaft 4 is reduced on the basis of empirical values or both the temperature profile is modified and the quantity of raw material fed to the shaft 4 is reduced on the basis of empirical values.

FIG. 2 also shows that the measuring container 12 has openings 21 on its base surface through which a part of the granulate flow 11 drains continuously. These openings 21 can have any shape, for example, rectangles, slots, or squares, where in particular circular openings 21 are preferably used.

Typical granule diameters of the expanded granulate 6 lie in the range of 0.5 to 5 mm. In order to ensure a continuous flow through the measuring container 12, the ratio between the granule diameter and the diameter of the openings 21 is preferably between 1:3 and 1:100, particularly preferably between 1:5 and 1:50, in particular between 1:5 and 1:25. For example, for a granule diameter of 2 mm and a factor of 30, a ratio of 1:10, the diameter of the openings 21 is obtained as 2 mm×10 as 20 mm.

In an alternative embodiment no openings 21 are provided in the base surface 17 which is why in this variant the emptying of the measuring container 12 must be accomplished in a different way. Preferably the emptying is achieved by cyclic pivoting of the measuring container 12, possibly by a rotatable mounting of the measuring container 12 on the side arm 19. In order to bring the measuring container 12 back into the initial position for filling with granulate, a rotation of the measuring container 12 through 360° is required. However, two or more measuring containers 12 could also be provided which are aligned with the base surfaces 17 with to one another and are rotatable about an axis which runs normally to the granulate flow from the funnel 18, possibly by arranging the measuring container 12 rotatably on the side arm 19. In the case of two measuring containers 12, the angle of rotation or pivot angle would thus be reduced to 180° to bring one of the measuring containers back into the initial position for filling, in the case of three measuring containers 12 it would be reduced to 120°, or in the case of three measuring containers 12 to 90°. In the case of several measuring containers 12 these can have a common base surface 17.

REFERENCE LIST

1 Sand grain-shaped raw material
2 Means for forming a temperature profile (resistance heaters)
3 Temperature profile
4 Shaft
5 Shaft flow
6 Expanded granulate
7 Pneumatic conveying line
8 Conveying flow
9 Extraction device
10 Gas cyclone
11 Granulate flow
12 Measuring container
13 Measuring device
14 Dosing element
15 Head region
16 Process air
17 Base surface
18 Funnel
19 Side arm
20 Overflow
21 Openings
22 Filter system
23 Additional measuring device
24 Additional extraction device
25 Control loop

The invention claimed is:

1. A device for measuring a bulk density of expanded granulate comprising:
   a separating device connectable to a pneumatic conveying line, to receive a conveying flow containing the expanded granulate from the pneumatic conveying line in order to separate the expanded granulate from the conveying flow into a granulate flow;
   at least one measuring container disposed underneath the separating device to receive at least a part of the granulate flow from the separating device, wherein the at least one measuring container comprises a base surface having openings in order to allow at least a part of the granulate flow that is received to drain continuously from the at least one measuring container; and
   a weighing device connected to the at least one measuring container configured to continuously measure weight of the expanded granulate flowing through the at least one measuring container in order to determine the bulk density of expanded granulate flowing through the at least one measuring container and to detect deviations from a desired bulk density of expanded granulate.

2. The device according to claim 1, wherein a means for concentrating the granulate flow is disposed between the separating device and the at least one measuring container.

3. The device according to claim 1, wherein the at least one measuring container is connected via a side arm to the measuring device.

4. The device according to claim 1, wherein an overflow for at least one part of the granulate flow is provided on the at least one measuring container.

5. A system for producing expanded granulate comprising:
   a vertical heated shaft comprising a plurality of heating elements, wherein the plurality of heating elements are designed to expand sand-grain-shaped raw material being fed into a first end of the vertical heated shaft to create expanded granulate;
   a conveying line being connected to a second end of the vertical heated shaft configured for receiving the expanded granulate and conveying it via a conveying flow; and
   a device for measuring a bulk density of expanded granulate comprising:
      a separating device connected to a pneumatic conveying line to receive the conveying flow containing the expanded granulate from the conveying line in order to separate the expanded granulate from the conveying flow into a granulate flow;
      at least one measuring container disposed underneath the separating device to receive at least a part of the granulate flow from the separating device, wherein the at least one measuring container has a base surface comprising openings configured to allow at least a part of the granulate flow that is received to drain continuously from the at least one measuring container; and a weighing device connected to the at least one measuring container configured to continuously measure weight of the expanded granulate flowing through the at least one measuring container in order to determine the bulk density of expanded granulate flowing through the at least one measuring container and to detect deviations from a desired bulk density of expanded granulate.

6. The device according to claim 1, wherein the separating device comprises a gas cyclone.

7. The device according to claim 2, wherein the means for concentrating the granulate flow comprises a funnel.

8. The device according to claim 1, wherein the weighing device comprises scales.

\* \* \* \* \*